United States Patent Office 2,862,092
Patented Nov. 25, 1958

2,862,092

INDUCTION WELDING

John V. Cowan, Danbury, Conn., assignor to Sperry Products, Inc., Danbury, Conn., a corporation of New York Application September 11, 1956, Serial No. 609,259

2 Claims. (Cl. 219—9.5)

This invention relates to induction welding and is especially adapted for the welding of objects having large cross sectional areas, particularly where such sections are of irregular shape. In induction welding of such large sections the outer layers quickly pass through the Curie point where they cease to be magnetic and the induced flux starts to heat the layers beneath the outer layers. The Curie point is however well below the melting point or welding temperature. The result is that the induced flux eventually concentrates in certain regions in the interior of the section and causes the metal in said regions to melt while the remaining regions of the section remain well below welding temperature. Thus in objects of circular section the flux eventually concentrates in the axis so that the metal in the central region flows out while the remainder of the section is below welding temperature. In the case of railroad rails the flux concentrates eventually in the head and base to form molten sections in these regions while the rest of the rail remains below welding temperature.

It is therefore one of the principal objects of this invention to provide a method and means for the induction welding of metals which is capable of producing substantially uniform heating throughout the sections to be welded even though the sectional area be large and the cross sectional shape irregular.

Further objects and advantages of this invention will become apparent in the following detailed description thereof.

In the accompanying drawings.

Figure 1:
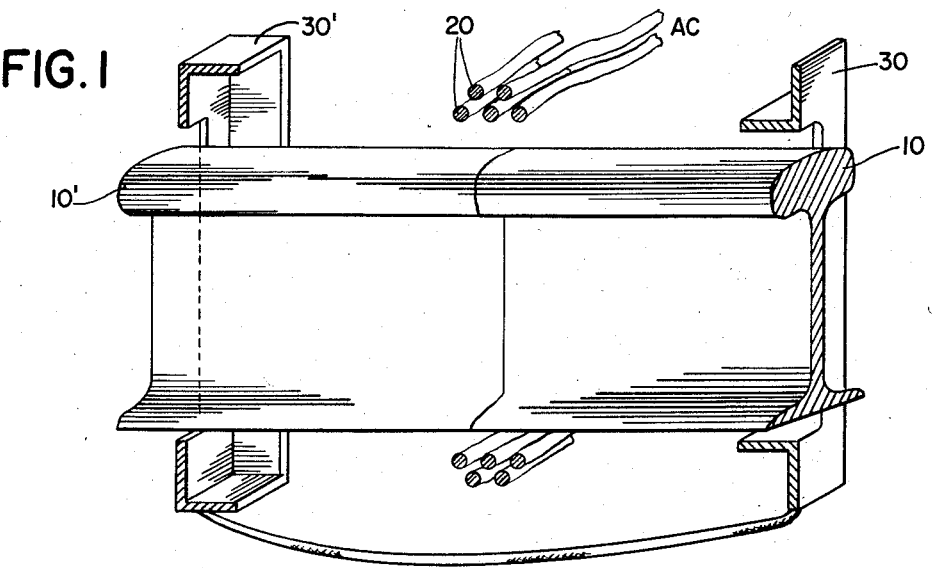
Fig. 1 is an isometric projection of two elements which are to be welded, showing the invention applied thereto.
Figure 2:
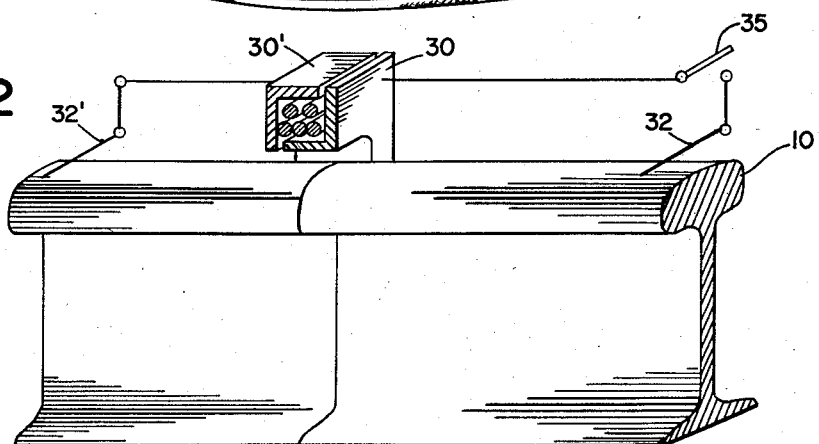
Fig. 2 is a view similar to Fig. 1 showing the parts in position for effecting the second step in the operation of the invention.
Figure 3:
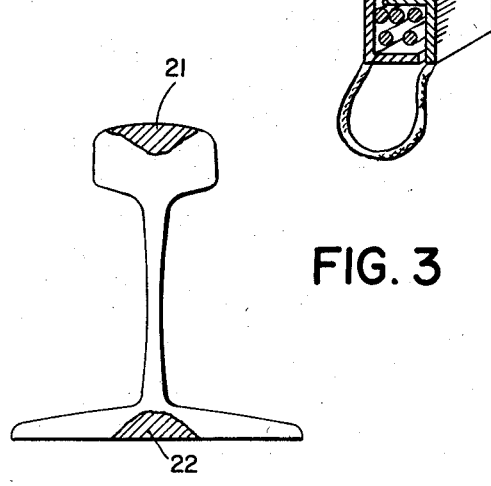
Fig. 3 is a vertical section through one of the elements being welded in Figs. 1 and 2 and showing the effects of uneven heating and flux distribution.

Referring to the drawings the present invention has been illustrated in connection with the welding of steel rails of the type used in railroad track, although it will be apparent from the description that the invention has general applicability to the induction welding of large sections generally and particularly where such sections are of irregular cross sectional shape. Thus the two rail sections 10, 10' have their ends abutting in position for welding. There is no air gap to cause oxidation and therefore it is not necessary to surround the rail ends with an inert gas. An induction coil indicated generally at 20 and comprising a plurality of turns, in this case five being shown, surrounds the abutting edges of the rail sections and said turns are spaced from the rail sections a short distance, approximately one inch from the rail surface. The abutting rail sections thus form the core of the coil. The shape of the induction coil follows the exterior shape of the rail. For the welding of fairly standard rail sections the terminals of the induction coil would be connected to a source of alternating current of suitable magnitude, such as, for example, 3,000 cycle, 2,500 amperes at 80 volts. The current thus supplied to the induction coil 20 will in the course of application for about one minute heat the outer layers of the abutting rail sections past the Curie point. The induced current then starts to heat the layers beneath the outer layers and so on until the entire section has been so heated. Further application of current will cause the flux to concentrate in certain axes in the interior of the section. As explained in the introduction hereto, in the case of a circular section the flux would concentrate in the region of the central axis to heat this region to the melting point which is substantially above the Curie point. In the case of rail sections the flux concentrates in a portion of the head and base, as shown in Fig. 3 at 21, 22, causing the metal in these regions to become molten while the remainder of the rail section remains well below welding temperature.

Under the conditions just described, it is obvious that the rail sections have not been properly prepared for welding and that welding could not be effected. To accomplish the result of effective welding the entire cross sectional area must be brought substantially to the melting temperature. Therefore this invention introduces a second step in the induction welding process as follows: At the end of one minute (in the case described herein), when the metal in any region of the sections has been brought to welding temperature, a two-part single turn coil 30, 30' is slid into effective position where it encircles the induction coil 20. Further energization of induction coil 20 will cause the major portion of the energy to be induced in single turn 30, 30' rather than in the rail and the energy so induced in the single turn will have a much higher amperage and lower voltage than in the induction coil 20, depending upon the ratio of turns. Thus in the example cited, the single turn coil 30, 30' may have induced therein 12,000 amperes at 18 volts. The single turn coil 30, 30' has two electrodes 32, 32' attached to the sections being welded at a predetermined distance from the welding joint. When the metal in any region of the sections becomes molten, i. e., reaches welding temperature a switch 35 is closed and the high amperage current now flows through the rail sections conductively instead of inductively. The portions of the rail sections which have reached welding temperature, such as the sections 21, 22 in Fig. 3, offer higher resistance to the flow of such current than the remaining portions of the rail sections, so that the major portion of the current will flow through the latter sections to cause said portions of the rails to be heated. Thus the remaining portions of the sections are quickly brought up to welding temperature comparable to the temperature of the molten portion. Welding may now be effected by push-up of the sections with the assurance that all portions of the sectional areas are at welding temperature.

Having described my invention, what I claim and desire to secure by Letters Patent is:

1. An apparatus for welding objects in abutting relation, comprising an induction coil surrounding the abutting ends so that said ends form the core of the coil, a single turn secondary coil adapted to be moved to inoperative position out of the field of flux of the induction coil until the induction coil heats said ends to a predetermined degree and adapted to be moved to operative position into the field of flux of said induction coil so as to be heated thereby when the ends have been heated to said degree, means for electrically connecting the secondary coil to said ends at predetermined distances from said abutment to form an electric circuit therethrough, and means for opening and closing said circuit, said circuit being adapted to be maintained open until the ends have been heated to the predetermined degree and being adapted to be closed when said ends have been heated to said predetermined degree to transmit to the objects the heat generated in the secondary coil by the induction coil.

2. An apparatus for welding objects in abutting relation as specified in claim 1, in which the secondary coil when in operative position surrounds the induction coil so as to occupy the same position relative to the abutting ends as the induction coil.

References Cited in the file of this patent

UNITED STATES PATENTS

| | | |
|---|---|---|
| 2,423,922 | Arndt | July 15, 1947 |
| 2,480,299 | Klinke | Aug. 30, 1949 |
| 2,632,079 | Body | Mar. 17, 1953 |
| 2,678,370 | Denneen | May 11, 1954 |

FOREIGN PATENTS

| | | |
|---|---|---|
| 727,142 | Great Britain | Mar. 30, 1955 |